Figure 1:
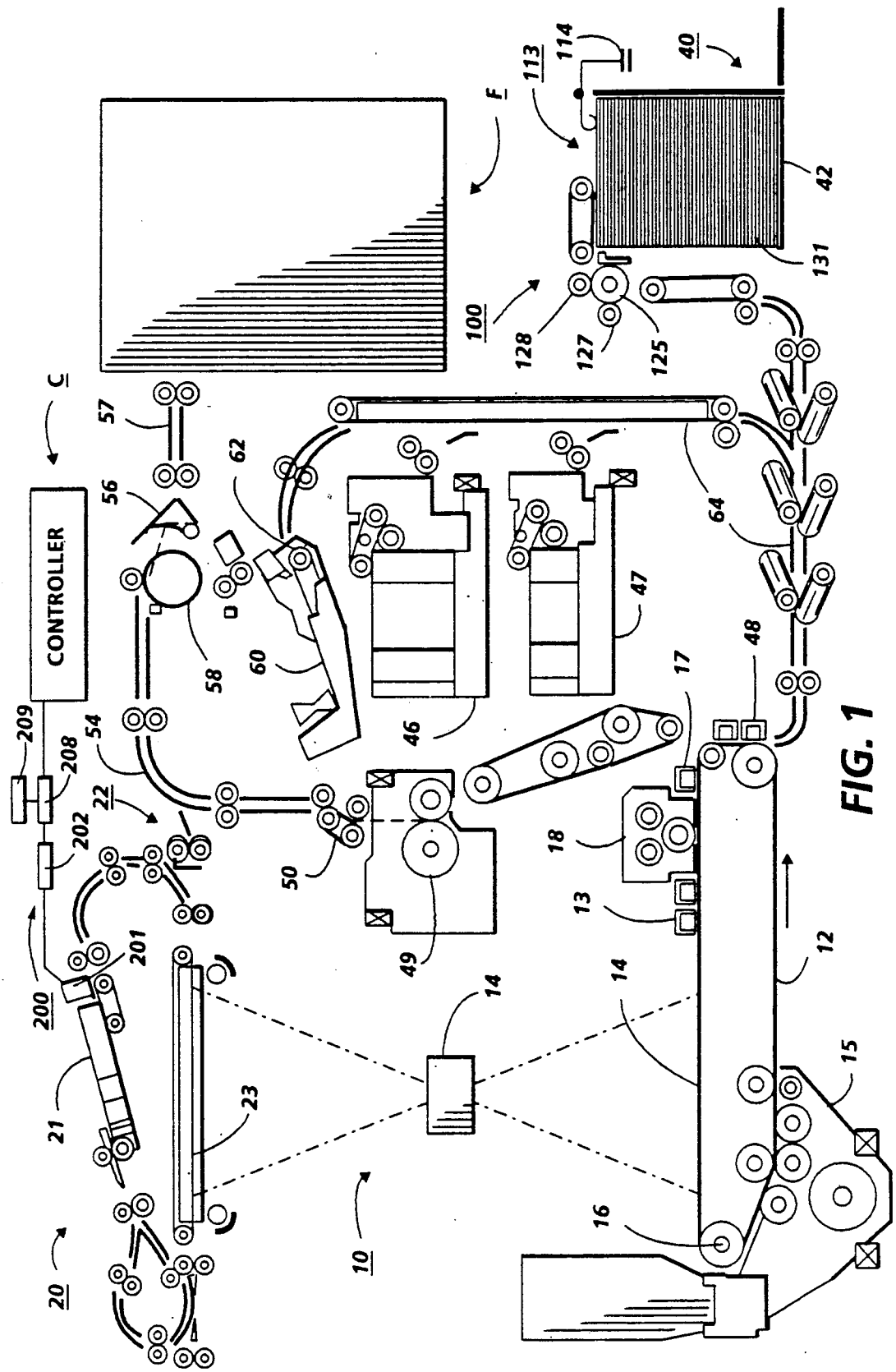

United States Patent [19]

Wierszewski et al.

[11] Patent Number: 5,048,813
[45] Date of Patent: Sep. 17, 1991

[54] BOTTOM VACUUM CORRUGATION FEEDER AIR KNIFE CALIBRATION SYSTEM AND METHOD

[75] Inventors: Ronald R. Wierszewski, Henrietta; Richard F. Scarlata, Rochester; Thomas Acquaviva, Penfield; James F. Matysek, Fairport, all of N.Y.

[73] Assignee: Xerox Corporation, Stamford, Conn.

[21] Appl. No.: 344,197

[22] Filed: Apr. 27, 1989

[51] Int. Cl.$^5$ .............................................. B65H 3/14
[52] U.S. Cl. ........................................ 271/98; 73/4 R
[58] Field of Search ................ 271/90, 97, 98; 73/4 R

[56] References Cited

U.S. PATENT DOCUMENTS

| | | | |
|---|---|---|---|
| 4,269,406 | 5/1981 | Hamlin | 271/108 |
| 4,336,928 | 6/1982 | Smith et al. | 271/3.1 |
| 4,418,905 | 12/1983 | Garavuso | 271/98 |
| 4,469,320 | 9/1984 | Wenthe, Jr. | 271/98 |
| 4,476,707 | 10/1984 | Burns et al. | 73/4 R |
| 4,550,903 | 11/1985 | Moore | 271/98 |
| 4,566,683 | 1/1986 | Moore | 271/98 |
| 4,597,570 | 7/1986 | Huggins | 271/98 |
| 4,632,377 | 12/1986 | Browse | 271/9 |
| 4,638,986 | 1/1987 | Huggins et al. | 271/98 |

OTHER PUBLICATIONS

H. A. Jenkins, Xerox Disclosure Journal, Low Cost Air Pressure Indicator, Apr. 1982, vol. 7, No. 2.

Primary Examiner—H. Grant Skaggs
Attorney, Agent, or Firm—William A. Henry, II

[57] ABSTRACT

An air knife pressure calibration system and method for a bottom vacuum corrugation recirculating document feeder includes measuring the air pressure and adjusting an air pressure control valve of the air knife to a predetermined value. This valve position is stored in a nonvolatile memory and can be used to create a table of values for various document stack heights by adding constant values that represent additional documents to the one document value. Thus, customized valve positions are accomplished that are machine as well as altitude sensitive.

5 Claims, 1 Drawing Sheet

BOTTOM VACUUM CORRUGATION FEEDER AIR KNIFE CALIBRATION SYSTEM AND METHOD

Hereby cross-referenced, and incorporated by reference, is the copending application of the same assignee, U.S. Ser. No. 07/166,281 entitled "Improved Top Vacuum Corrugation Feeder" by Glenn M. Herbert et al., filed Mar. 10, 1988.

This invention relates to an electrophotographic printing machine, and more particularly, concerns an improved top vacuum corrugation feeder for such a machine.

Present high speed xerographic copy reproduction machines and printers produce copies at a rate in excess of several thousand copies per hour, therefore, the need for a document handler to feed documents from a stack to a copy platen of the machine in a rapid dependable manner has been reorganized to enable full utilization of the machine's potential copy output. These document sheet feeders must operate flawlessly to virtually eliminate the risk of damaging the sheets and generate minimum machine shutdowns due to uncorrectable misfeeds or sheet multifeeds. It is in the initial separation of the individual sheets from the sheet stack where the greatest number of problems occur.

Various attempts have been made at improving document handlers by controlling air flow through the document handlers, for example, U.S. Pat. Nos. 4,550,903 and 4,566,683 that disclose document sheet handlers/copy sheet feeders which have an air knife to aid in sheet separation. In the '683 patent, air flow quantity is varied to one of four settings depending upon the weight or pressure of sheets placed in the feeder. In the '903 patent, air flow quantity is varied to one of four settings as determined by counting the documents feed through a handler during an initial feed cycle. In U.S. Pat. No. 4,336,928, a document handler is shown having an air knife to aid in sheet separation. Air flow from the air knife is increased when a document count is above a preselected number. U.S. Pat. Nos. 4,638,986 and 4,597,570 disclose feedability sensors for a vacuum feeder with an air knife. A frictional force f and stack weight m are estimated and used to estimate a coefficient of friction. The coefficient of friction is used to control the amount of air pressure in the air knife system. A bottom sheet separator feeder having an air knife for sheet separation is shown in U.S. Pat. No. 4,632,377. An air knife relief valve can be opened or closed to vary the air pressure of the air knife. A sheet feeder with an air knife is disclosed in U.S. Pat. No. 4,469,320. When certain values exceed a preset level, a switch is activated to increase the output of the air knife.

One of the document sheet feeders best known for high speed operation is the bottom vacuum corrugation feeder with a front air knife as disclosed in U.S. Pat. Nos. 4,296,406 and 4,418,905 which are incorporated herein to the extent necessary to practice the present invention. In these systems a vacuum plenum with a plurality of friction belts arranged to run over the vacuum plenum is placed at the bottom of a stack of document in a supply tray. At the front of the stack, an air knife is used to inject air into the stack to raise the stack so that the bottommost document can be separated from the remainder of the stack. In operation, air is injected by the air knife toward the stack to separate the bottom sheet, the vacuum pulls the separated sheet down and acquires it. Following acquisition, the belt transport drives the sheet forward off the stack of sheets.

To accomplish the levitation of the document stack in bottom vacuum corrugation feeders in a manner to permit feeding only the bottom document of a stack reliably, the air flow level of the air knife must be controlled accurately, flow rate being a function of the document stack height, the greater the stack height, the more air flow required. Ordinarily, a stepper motor or similar device is used to position the air flow control valve. A lookup table that defines the the valve position for various stack heights is generally used. A fixed lookup table does not take into account machine to machine differences (motor and blower speeds) or system behavior such as air system leakage that may change due to altitude effects. Due to these variables, the air flow setting with a fixed table is often incorrect and results in feeding problems.

Accordingly, disclosed herein is a method for calibrating the required air flow for the air knife in a recirculating vacuum corrugation feeder, comprising the steps of (a) turning on the blower connected to the air knife; (b) opening up the air knife valve to a small default value via a linear stepper motor; (c) measuring air knife pressure; (d) adjusting the pressure to achieve about 20 mm/$H_2O$ by opening or closing the air knife valve; (e) storing the valve position in a non-volatile memory; and (f) creating table of the values for various document stack heights by adding constant values to the value obtained in step (e).

For a better understanding of the invention as well as other objects and further features thereof, reference is made to the following drawing and description.

FIG. 1 is a schematic elevational view of an electrophotographic printing machine incorporating the features of the present invention therein.

While the present invention will be described hereinafter in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the features of the present invention, reference is had to the drawing. In the drawing, like reference numerals have been used throughout to designate identical elements. FIG. 1 schematically depicts the various components of an illustrative electrophotographic printing machine incorporating the bottom feed vacuum corrugation feeder method and apparatus of the present invention therein. It will become evident from the following discussion that the sheet feeding system disclosed herein is equally well suited for use in a wide variety of devices and is not necessarily limited to its application to the particular embodiment shown herein. For example, the apparatus of the present invention may be readily employed in non-xerographic environments and substrate transportation in general.

Inasmuch as the art of electrophotographic printing is well known, the various processing stations employed in the FIG. 1 printing machine will be shown hereinafter schematically and the operation described briefly with reference thereto.

The exemplary copier 10 of FIG. 1 will now be briefly described. The copier 10 conventionally includes a xerographic photoreceptor belt 12 and the xerographic stations acting thereon for respectively corona charging 13, image exposing 14, image developing 15, belt driving 16, precleaning discharge 17 and toner cleaning 18. Documents on the platen 23 maybe imaged onto the photorecptor 12 through a variable reduction ratio optical imaging system to fit the document images to the selected size of copy sheets.

The control of all machine functions, including all sheet feeding, is, conventionally, by the machine controller "C". The controller "C" is preferably a known programmable microprocessor, exemplified by the microprocessor disclosed in U.S. Pat. No. 4,166,558. The controller "C" conventionally controls all of the machine steps and functions described herein, and others, including the operation of the document feeder 20, all the document and copy sheet deflectors or gates, the sheet feeder drives, the finisher "F", etc. The copier controller also conventionally provides for storage and comparison of the counts of the copy sheets, the number of documents recirculated in a document set, the desired number of copy sets and other selections and controls by the operator through the console or other panel of switches connected to the controller, etc. The controller is also programmed for time delays, jam correction control, etc. Conventional path sensors or switches may be utilized to help keep track of the position of the documents and the copy sheets and the moving components of the apparatus by connection to the controller. In addition, the controller variably regulates the various positions of the gates depending upon which mode of operation is selected.

The copier 10 is adapted to provide either duplex or simplex precollated copy sets from either duplex or simplex original documents presented by the recirculating document handler (RDH) 20. Two separate copy sheet trays 46 and 47 and a multi-ream feeder apparatus 100 are provided for feeding clean copy sheets from either one selectably. They may be referred to as the main tray 46, auxiliary tray 47 and high capacity feeder 100.

The copy sheets are fed from the selected one of the trays 46, 47 or 100 to the transfer station 48 for the conventional transfer of the xerographic toner image of document images from the photoreceptor 12 to the first side of a copy sheet. The copy sheets are then fed by a vacuum transport to a roll fuser 49 for the fusing of that toner image thereon. From the fuser, the copy sheets are fed through a sheet decurler 50. The copy sheets then turn a 90° corner path 54 in the sheet path which inverts the copy sheets into a last-printed face-up orientation before reaching a pivotal decision gate 56. The image side which has just been transferred and fused is face-up at this point. If this gate 56 is down it passes the sheets directly on without inversion into the output path 57 of the copier to the finishing module "F". If gate 56 is up it deflects the sheets into a duplex inverting transport 58. The inverting transport (roller) 58 inverts and then stacks copy sheets to be duplexed in a duplex buffer tray 60.

The duplex tray 60 provides intermediate or buffer storage for those copy sheets which have been printed on one side and on which it is desired to subsequently print an image or images on the opposite side thereof, i.e. copy sheets in the process of being duplexed. Due to the sheet inverting by the roller 58, these buffer set copy sheets are stacked into the duples tray 60 face-down. They are stacked in this duplex tray 60 on top of one another in the order in which they were copied.

For the completion of duplex copying, the previously simplexed copy sheets in the tray 60 are fed seriatim by its bottom feeder 62 back to the transfer station 48 for the imaging of their second or opposite side page image. This is through basically the same copy sheet transport path (paper path) 64 as is provided for the clean (blank) sheets from the trays 46, 47 or 100. It may be seen that this copy sheet feed path 64 between the duplex tray 60 and the transfer station 48 has an inherent inversion which inverts the copy sheets once. However, due to the inverting transport 58 having previously stacked these buffer sheets printed face-down in the duplex tray 60, they are represented to the photoreceptor 12 at the transfer station 48 in the proper orientation, i.e. with their blank or opposite sides facing the photoreceptor 12 to receive the second side image. This is referred to as the "second pass" for the buffer set copies being duplexed. The now fully duplexed copy sheets are then fed out again through the fuser 49 and fed out into the output path 57.

The output path 57 here transports the printed copy sheets directly, one at a time, into the connecting, on-line, modular, finishing station module "F". There the completed precollated copy sets may be finished by stapling, stitching, gluing, binding, and/or offset stacking. Suitable details are disclosed in the cited art, or other art, or in the applications cross-referenced hereinabove.

It is believed that the foregoing description is sufficient to illustrate the general operation of an electrostatographic machine.

Referring now to a particular aspect of the present invention. The copier of FIG. 1 has a means 200 for calibrating the air flow in air knife 201 and includes an adjustable valve 202 that is controlled by conventional controller "C". This calibration means 200 is positioned within the airflow system of RDH 20. Generally, in a recirculating document handler 20 which in this instance is a vacuum corrugation feeder, a plurality of feed belts are supported for movement on feed belt rolls. Spaced within the run of the belts, there is provided a vacuum plenum having openings therein adapted for cooperation with perforations in the belts to provide a vacuum for pulling the bottom document in the document stack onto the belts. The plenum is provided with raised portion beneath the center run so that upon capture of the bottom document in the stack against the belts, a center corrugation will be produced in the bottom sheet. Also, the belts are below the surrounding support surfaces. Thus, the document is corrugated. The flat surfaces of the vacuum belts on each side of the raised center belt generates a region of maximum stress in the document which varies with the document beam strength. In the unlikely event that more than one document is pulled down into contact with the feed belts, the beam strength of the second document resists the corrugation action, thus gaps are opened between sheets one and two which extend to their lead edges. The gaps and channels reduce the vacuum levels between sheets one and two due to porosity in sheet one and provide for entry of the separating air flow from the air knife 201. The air knife 201 comprised of a pressurized air plenum having a plurality of air jet openings is provided to inject air into the pocket formed between the document pulled down against the feed belt and the documents thereabove to provide an air cushion or bearing between the stack and the bottom document to minimize the force necessary for removing the bottom document from the stack. It can be understood that if two documents are pulled down toward the belts, since the top sheet would not be corrugated, the air knife would inject air into the space between the two documents and force the second document off from the raised belt back toward the document stack.

The pressure required to levitate the stack is proportional to stack height (i.e., the higher the stack, the higher the pressure). However, too much pressure for a given stack will cause other feeding problems. For a given stack height there is a minimum and maximum pressure for optimum performance. Therefore, since the air knife 201 is used to levitate the document stack in order to permit feeding of only the bottom document in the stack and eliminate the effects of air system hardware leakage and variability due to changes in altitude, etc., a unique air knife calibration system 200 is shown in FIG. 1. The calibration system comprises a nonvolatile memory in controller "C", a stepper motor 208, air pressure control valve 202 and air pressure source (not shown) and air knife 201. The entire system is calibrated to the performance of a single document placed in the document tray 21. In order to calibrate air knife 201, the blower that is connected to the air knife is turned ON and the air pressure control valve 202 is opened to a small default value. The the air pressure is then measured by the use of a manometer or other comparable device. A typical pressure for one document is 20 mm/$H_2O$. If the air pressure is not correct for one document, the valve is altered (open/closed) until the correct air pressure is obtained. This valve position is stored in the non-volatile memory of controller "C" and is used to create a table of values for various document stack heights by adding constant values to the originally obtained one document value. Each of the added values represent the effect of additional documents. Therefore, the thus obtained table becomes a list of variables, each equal to the one document value plus an offset with the offset being dependent upon the incremental number of documents in the stack.

The calibration system 200 is used at machine build, install and whenever there is any alteration in the air system hardware. It should be understood that this air knife calibration method customizes the valve opening positions for the particular machine and location and is thus altitude sensitive as well.

What is claimed is:

1. In a bottom sheet separator-feeder for separating and forwarding sheets seriatim, comprising: a stack tray adapted for supporting a stack of sheets, vacuum sheet feed means associated with the tray and located in a position spaced from the bottom sheet in the stack, air injection means adapted to provide a layer of air between the bottom sheet and the remainder of the sheets in the stack, the improvement for calibrating the air injection means, characterized by:

air pressure control valve means for controlling the air flow to said air knife;

means for obtaining a one sheet air pressure position of said air pressure control valve means by measuring the air pressure of said air pressure control valve means with one sheet in the stack tray; and non-volatile memory means for storing said one sheet valve position of said air pressure control valve so that a table of values for various sheet stack heights can be accomplished by adding constant values to said one sheet valve position measurement and thereby compensate for differences in separator-feeders and altitudes.

2. The improvement of claim 1, including stepper motor means for controlling the opening or closing of said air pressure control valve in accordance with values of said table.

3. A method for calibrating the air system in a bottom sheet separator-feeder that includes an air knife with a blower and an air flow control valve used to compensate for differences in machines and altitudes, comprising the steps of: (a) turning on the blower connected to the air knife; (b) opening up the air knife valve to a small default value; (c) measuring air knife pressure; (d) adjusting the pressure to achieve about 20 mm/$H_2O$ by opening or closing the air knife valve; (e) storing the valve position in a nonvolatile memory; and (f) creating a table of values for various document stack heights by adding constant values to the value obtained in step (d).

4. The method of claim 3, including the step of controlling the air flow of said air flow control valve with said table created in step (f).

5. The method of claim 4, including the step of controlling the air flow of said air flow control valve with a linear stepper motor.

* * * * *